(12) United States Patent
Pearlman

(10) Patent No.: US 9,441,707 B2
(45) Date of Patent: *Sep. 13, 2016

(54) RELEASE APPARATUSES WITH LOCKING SURFACES FORMED AT CONTACT ANGLES AND METHODS OF MANUFACTURING RELEASE APPARATUSES

(71) Applicant: InterOcean Systems, Inc., San Diego, CA (US)

(72) Inventor: Michael D. Pearlman, San Diego, CA (US)

(73) Assignee: INTEROCEAN SYSTEMS LLC, Broussard, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,259

(22) Filed: Jan. 23, 2015

(65) Prior Publication Data

US 2016/0215853 A1 Jul. 28, 2016

(51) Int. Cl.
*B66C 1/34* (2006.01)
*F16G 15/04* (2006.01)
*B63B 21/20* (2006.01)

(52) U.S. Cl.
CPC .............. *F16G 15/04* (2013.01); *B63B 21/20* (2013.01); *B63B 2021/203* (2013.01)

(58) Field of Classification Search
CPC ..... F16G 15/04; B63B 35/70; B63B 35/816; B63B 21/20; B63B 2021/203; B66C 1/34; B66C 1/54; E21B 19/06; B25J 15/0226
See application file for complete search history.

(56) References Cited

U.S. PATENT DOCUMENTS

| | | | |
|---|---|---|---|
| 2,941,835 A | 6/1960 | Musser | |
| 2,949,330 A | 8/1960 | Musser | |
| 3,408,101 A | 10/1968 | Savary | |
| 3,601,261 A | 8/1971 | Michot | |
| 3,801,051 A | 4/1974 | Hosterman | |
| 3,905,190 A | 9/1975 | Pearlman | |
| 4,616,590 A * | 10/1986 | Albertini | B26F 3/04 114/230.2 |
| 4,630,522 A * | 12/1986 | Palmer | B26F 3/04 114/230.2 |
| 5,195,794 A * | 3/1993 | Hummel, Jr. | B65G 47/90 294/94 |
| 8,880,302 B1 | 11/2014 | Tachibana et al. | |
| 2008/0145264 A1 | 6/2008 | Hetzner | |

OTHER PUBLICATIONS

U.S. Appl. No. 14/604,214, Pearlman.

(Continued)

*Primary Examiner* — Stephen Vu
(74) *Attorney, Agent, or Firm* — Law Office of Jesse D. Lambert, LLC

(57) ABSTRACT

Some embodiments provide release apparatuses comprising: a body comprising a first mating section and a second mating section connected to first and second tethers; and a plurality of movable locking shoes secured with the first mating section and movable between a first position configured to lock the first mating section and the second mating section together and a second position configured to allow the first mating section and the second mating section to disconnect; wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees.

9 Claims, 6 Drawing Sheets

(56) References Cited

OTHER PUBLICATIONS

U.S. Appl. No. 14/604,241, Pearlman.
U.S. Appl. No. 14/604,285, Pearlman.
Interocean Systems, Inc., "Model 111 Shallow Water Acoustic Release", commercially available prior to Jan. 23, 2015, 3 pgs., http://www.interoceansystems.com/rel_111.htm.
Interocean Systems, Inc., "Model 1090E Transponding Acoustic Release", commercially available prior to Jan. 23, 2015, 4 pgs., http://www.interoceansystems.com/rel_1090e.htm.
Interocean Systems, Inc., "Model 1090J Acoustic Valve Operator", commercially available prior to Jan. 23, 2015, 2 pgs., http://www.interoceansystems.com/rel_1090j.htm.
Interocean Systems, Inc., "Model 5000E Heavy Duty Underwater Release", commercially available prior to Jan. 23, 2015, 2 pgs., http://www.interoceansystems.com/rel_5000e.htm.
Interocean Systems, Inc., "Model 6500/6600 Rig Anchor Release", commercially available prior to Jan. 23, 2015, 3 pgs., http://www.interoceansystems.com/rel_rar.htm.
Interocean Systems, Inc., "Model MR5000B Motor Driven Release", commercially available prior to Jan. 23, 2015, 2 pgs., http://www.interoceansystems.com/rel_mr5000b.htm.
Interocean Systems, Inc., "Releases", commercially available prior to Jan. 23, 2015, 2 pgs., http://www.interoceansystems.com/releasemain.htm.
PCT; App. No. PCT/US2016/013866; International Search Report and Written Opinion mailed Apr. 21, 2016.

\* cited by examiner

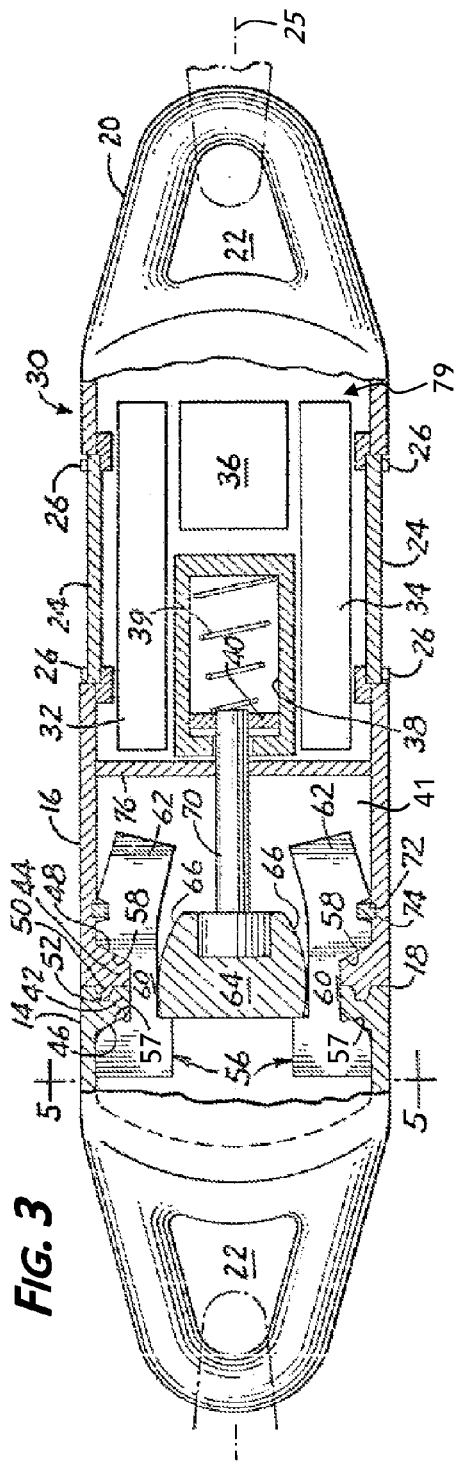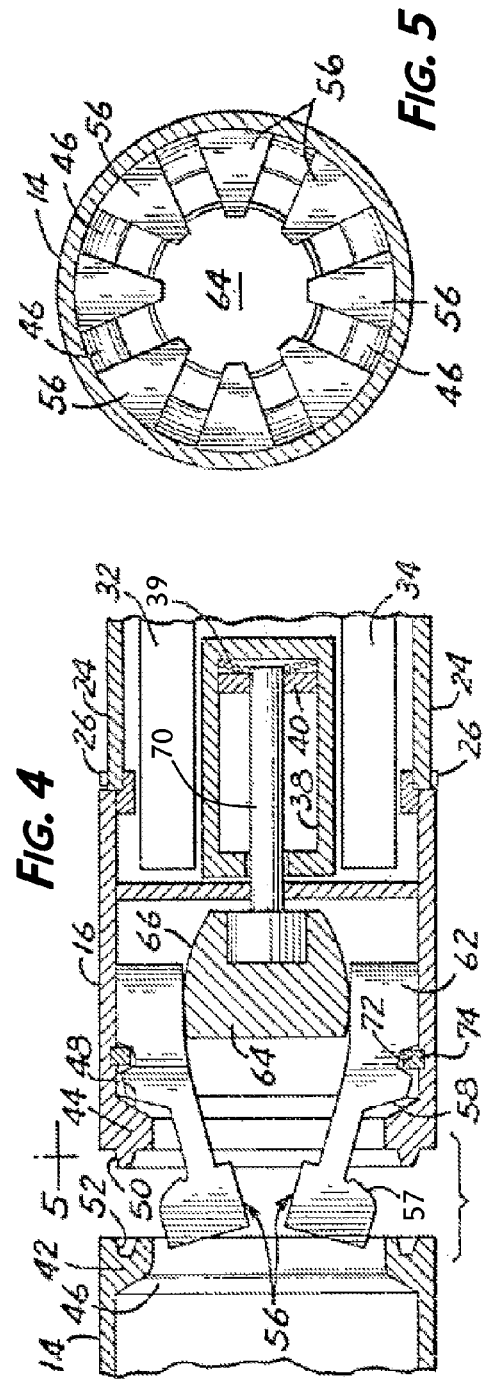

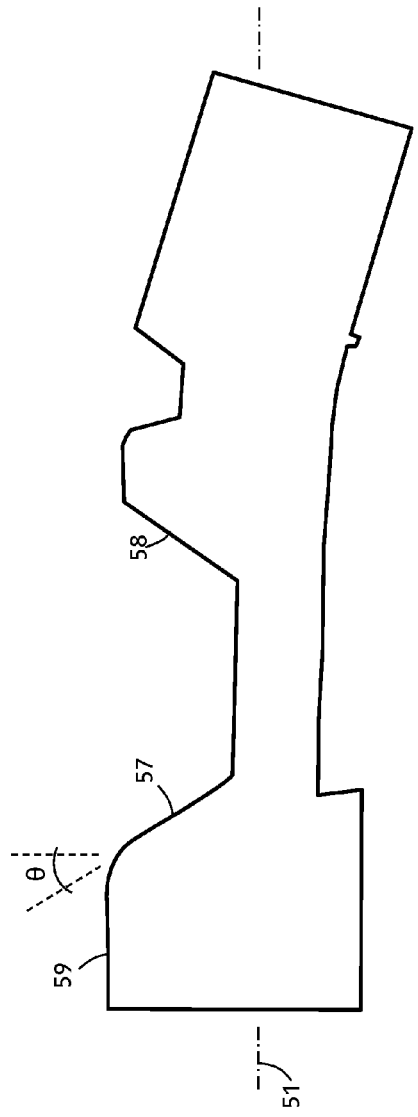
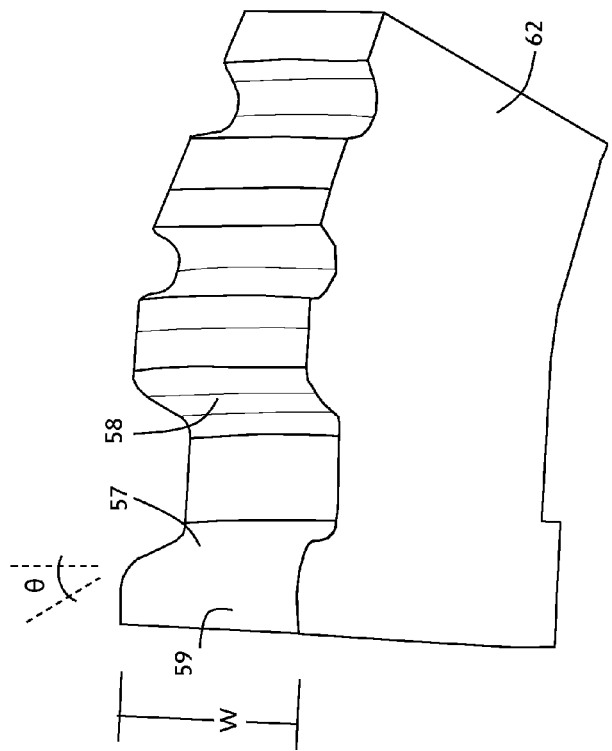

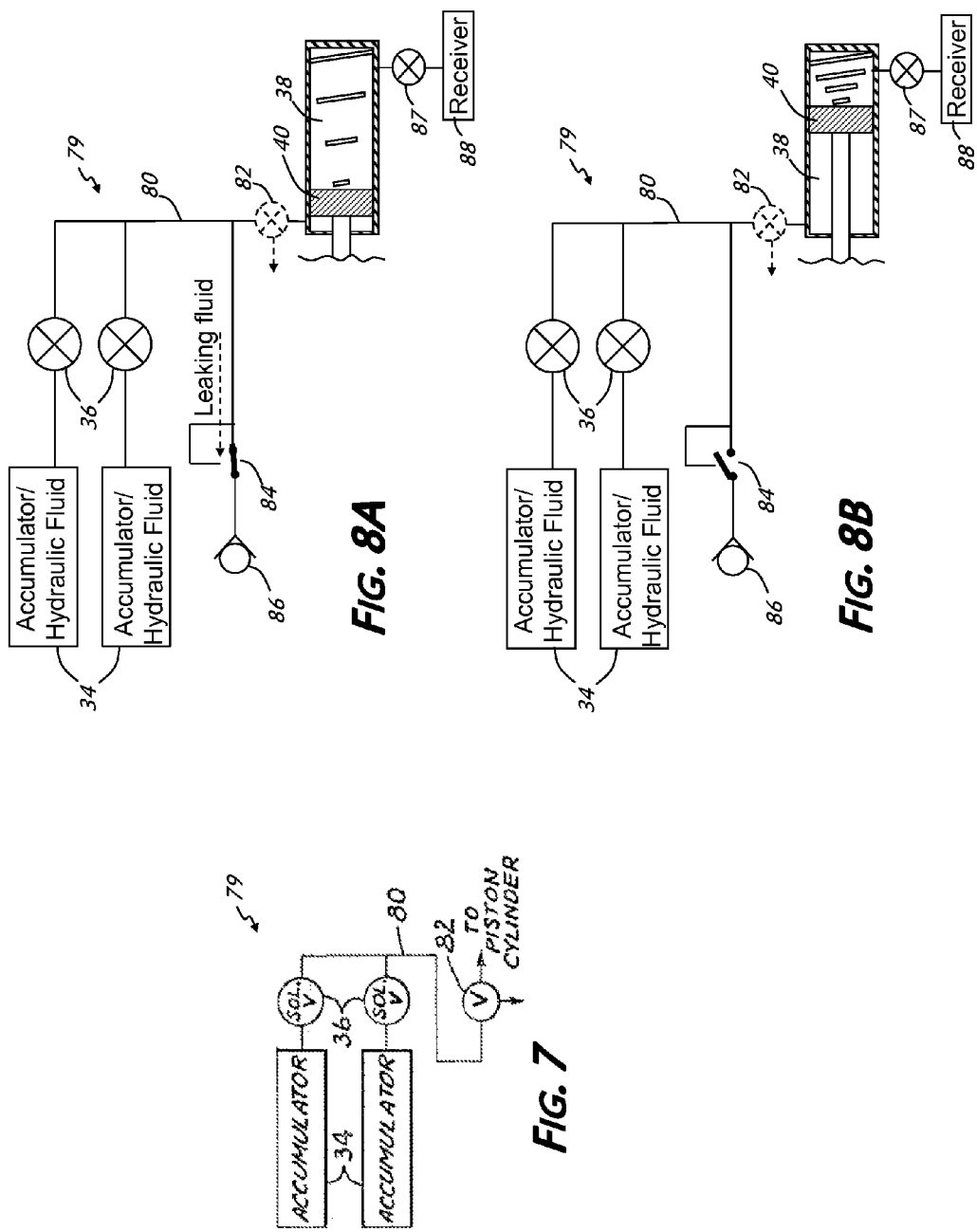

RELEASE APPARATUSES WITH LOCKING SURFACES FORMED AT CONTACT ANGLES AND METHODS OF MANUFACTURING RELEASE APPARATUSES

This application relates to the following applications filed concurrently herewith. The related applications are: U.S. patent application Ser. No. 14/604,214, of Michael D. Pearlman, entitled Release Apparatus and Method of Manufacturing a Release Apparatus, which is incorporated in its entirety herein by reference; U.S. patent application Ser. No. 14/604,241, of Michael D. Pearlman, entitled Methods of Manufacturing Release Apparatuses, which is incorporated in its entirety herein by reference; and U.S. patent application Ser. No. 14/604,285, of Michael D. Pearlman, entitled Release Apparatuses Comprising a Hydraulic System and Methods of Manufacturing Release Apparatuses, which is incorporated in its entirety herein by reference.

BACKGROUND

1. Field of the Invention

The present invention relates generally to release apparatuses, and more specifically to relatively large load release apparatuses.

2. Discussion of the Related Art

Relatively thick and/or large mooring tethers (e.g., cables, chains, and the like, or combinations thereof) that are used for mooring large ships, drilling platforms, vessels and the like that are moored or anchored at sea occasionally must be severed while under relatively high load.

In the past, mooring chains and/or cables may have been severed by cutting them or have merely been run out by a winch. While these ways may be somewhat effective for some circumstances, there are limits such as in the length of chain or cable that can be run out, the cutting of chain or cable can take a relatively long amount of time because the chain or cable are typically relatively large, e.g., the thickness of the metal in the links can be three inches or more.

SUMMARY OF THE INVENTION

Some embodiments provide release apparatuses configured to releasably secure two bodies together. For example, some implementations provide release apparatus comprising: a body having a first mating section and a second mating section with each of the first and second mating sections being connected to one of two separate tethers so that separation of the first mating section from the second mating section separates the two separate tethers; locking shoes each movably secured with the first mating section and movable between a first position configured to lock the first mating section and the second mating section together and a second position configured to allow the first mating section and the second mating section to disconnect; an actuator cooperated with the first mating section and configured to at least move the locking shoes from the first position to the second position; wherein each of the locking shoes comprises a locking surface configured to contact an engagement surface of the second mating section and maintain a position of the first mating section with the second mating section when the locking shoes are in the first position; wherein portions of the locking surface of each of the multiple locking shoes comprise toric geometries that are not in contact with the engagement surface of the second mating section when the locking shoes are in the first position and do not come into contact with the engagement surface as the locking shoes transition from the first position to the second position.

Further, some embodiments provide release apparatuses configured to releasably interconnect two separate tethers and withstand hundreds of thousands of pounds of tension, comprising: a first mating section; and a second mating section configured to be releasably secured with the first mating section while the first mating section is in a first state and to disengage from the first mating section when the first mating section is in a second state allowing the first mating section to separate from the second mating section; wherein the first mating section comprises a housing and multiple locking shoes movably secured with the housing such that each locking shoe is configured to move at least between a lock position when the first mating section is in the first state and a disengage position when the first mating section is in the second state; wherein each of the multiple locking shoes comprises a locking surface; wherein the second mating section comprises one or more engagement surfaces each configured to be in contact, when the first mating section and the second mating section are coupled together while the first mating section is in the first state, with the locking surface of at least one of the multiple locking shoes such that each locking surface of each of the locking shoes is in contact with at least one of the one or more engagement surfaces, such that when the first mating section is in the first state the contact between the one or more engagement surfaces of the second mating section and the locking surfaces of the multiple locking shoes secures the first mating section with the second mating section and maintains a relative positioning of the first mating section with the second mating section and withstands opposing separation forces in excess of hundreds of thousands of pounds; and wherein toric portions of the locking surface proximate opposing sides of each of the multiple locking shoes comprise toric geometries.

Additionally, some embodiments provide methods of manufacturing release mechanisms, comprising: carburizing a plurality of locking shoes configured to be positioned within a release mechanism intended for use in temperatures that are below 5° C. and cooperatively implemented to withstand forces of at least a hundred thousand pounds, wherein the carburizing comprises exposing the plurality of locking shoes to a carbon-bearing source and heat treating the plurality of locking shoes while exposed to the carbon-bearing atmosphere; austenitizing the plurality of locking shoes at a temperature of greater than 1400° F. following the carburizing; performing a first tempering the plurality of locking shoes at a first tempering temperature; performing a second tempering of the plurality of locking shoes at a second tempering temperature that is different than the first tempering temperature; and flame hardening one or more surfaces of each of the plurality of locking shoes.

Some embodiments additionally or alternatively provide release apparatuses, comprising: a body comprising a first mating section and a second mating section with the first mating section being connected to a first tether and the second mating section being connected to a separate second tether so that separation of the first mating section from the second mating section separates the first and second tethers; and a plurality of movable locking shoes secured with the first mating section and movable between a first position configured to lock the first mating section and the second mating section together and a second position configured to allow the first mating section and the second mating section to disconnect; wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees from a plane perpendicular to a longitudinal axis of the release apparatus.

Further still, some embodiments provide release apparatuses, comprising: a body having a first mating section and a second mating section with each of the first and second mating sections being connected to one of two separate tethers so that separation of the first mating section from the second mating section separates the two separate tethers; the first mating section comprising a plurality of movable locking shoes movable between a locked position configured to lock the first mating section with the second mating section while withstanding opposing forces that exceed one hundred thousand pounds and a release position configured to allow the first mating section and the second mating section to disconnect; and a hydraulic system configured to induce a force in response to a release command to cause movement of the locking shoes between the locked position and the release position, wherein the hydraulic system comprises: a hydraulic fluid source; a hydraulic conduit coupled with the hydraulic fluid source; a hydraulic cylinder coupled with the hydraulic conduit and configured to receive hydraulic fluid; and a bypass valve coupled upstream along the hydraulic conduit from the hydraulic cylinder, wherein the bypass valve is configured to transition between an open state and a closed state in response to pressure within the hydraulic conduit exceeding a hydraulic threshold and to allow leaked hydraulic fluid to be drained from the conduit while the bypass valve is in the open state.

Furthermore, some embodiments provide methods of releasably securing two tethers each extending to different objects, comprising: maintaining a bypass valve of a hydraulic system of a release apparatus in an open state; drawing leaked hydraulic fluid leaked within the hydraulic system through the bypass valve to drain the hydraulic fluid from a conduit with which the bypass valve couples while the bypass valve is in the closed state such that pressure within a hydraulic cylinder coupled with the conduit does not exceed a cylinder pressure threshold that is configured to cause movement of one or more of a plurality of locking shoes of the release apparatus from a locked position to a released position allowing a separation of a first mating section of the release apparatus from a second mating section of the release apparatus, wherein each of the first and second mating sections are connected to one of two separate tethers so that separation of the first mating section from the second mating section separates the two separate tethers, wherein the locking shoes when in the locked position maintain a position of the first mating section with the second mating section while withstanding opposing forces that exceed one hundred thousand pounds; activating one or more release valves in response to a release command to release hydraulic fluid under pressure into the conduit to flow into the hydraulic cylinder; and closing the bypass valve in response to a pressure within the conduit exceeding a hydraulic threshold in response the release of the hydraulic fluid into the conduit, wherein the closing of the bypass valve prevents subsequent hydraulic fluid from exiting through the bypass valve.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 shows a cross-sectional view of an exemplary release apparatus, in accordance with some embodiments.

FIG. 4 shows an enlarged, partial cross-sectional view of the exemplary release apparatus of FIG. 3, in accordance with some embodiments.

FIG. 5 shows a cross-sectional view of an exemplary release apparatus, in accordance with some embodiments.

FIG. 6A shows a cross-sectional view of an exemplary locking shoe, in accordance with some embodiments.

FIG. 6B illustrates a simplified perspective view of an exemplary locking shoe, in accordance with some embodiments.

FIG. 7 illustrates a simplified schematic diagram of an exemplary hydraulic system utilized a release apparatus, in accordance with some embodiments.

FIGS. 8A and 8B illustrate a simplified block, schematic diagram of an exemplary hydraulic system utilized in a release apparatus, in accordance with some embodiments.

Figure 1:
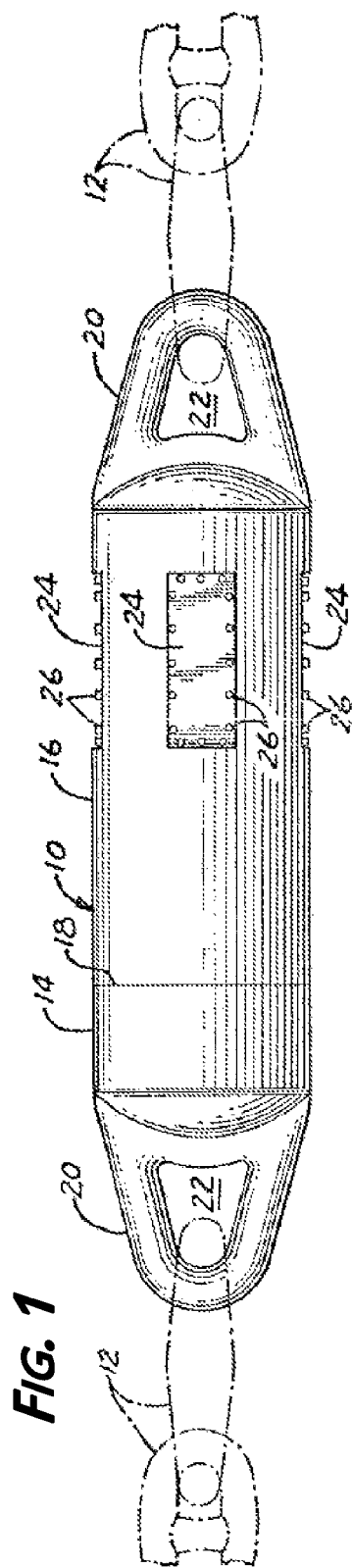
FIG. 1 shows a plan view of an exemplary release apparatus in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are described to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 shows an exemplary release apparatus 10 in accordance with some embodiments. The release apparatus 10 is configured to cooperatively secure and release opposing relatively large tethers 12. The tethers can be substantially any relevant tether configured to withstand thousands of pounds of force or load, often tens of thousands of pounds of force, and in some instances hundreds of thousands of pounds of force or more. For example, the tethers 12 can be mooring chains, cables, other such tethers, or combinations of such tethers.

In some embodiments, the release apparatus 10 comprises two body or mating sections 14 and 16 that are configured to be releasably secured to each other and separable or disconnectable. In some implementations, the two mating sections are separable along a line indicated at 18. The release apparatus further includes an activatable or actuable mechanism that when activated allows the two mating sections 14 and 16 to separate from one another, which can relieve a load or tension that is placed upon the release apparatus 10 and tethers 12.

For example, the release apparatus 10 can be utilized in securing drilling platform, ship or the like, such as through an anchoring, mooring or the like. In the event a drilling platform, ship or the like must be released from anchor, etc., because of unusually foul weather or other dangerous conditions such as, for example, the approach of an iceberg on a collision course with an anchored platform which necessitates a release of the anchor tethers, the release apparatus 10 can be activated allowing the two mating sections 14 and 16 and thus the corresponding two tethers to separate. Further, the release apparatus is advantageous at least when disconnection is beneficial, necessary or required in an explosive atmosphere and the use of flame cutting tools or tools that could create sparks would be prohibited.

Figure 2:
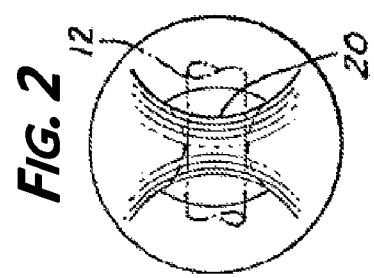
FIG. 2 illustrates an end view of the release apparatus of FIG. 1 showing an example of an end cap with an integral link portion and a tether.

In some embodiments, the activation of the release apparatus 10 comprises a communication of one or more predetermined coded acoustic command signals. In response to receiving the activation or release command signal, a controller or controllers of the release apparatus 10 can initiate a series of events that result in the mating sections 14 and 16 being separated from one another to release the platform or the like that is anchored by the tethers 12. In some embodiments, each mating section 14 and 16 comprise a link portion 20 extending from and/or attached to the end of each of the mating sections 14 and 16. Typically, the link portions are integrally formed with the mating sections. Each of the link portions has an opening 22 so that an anchor shackle, link or the like can be connected to the tether 12 and/or a portion of the tether can be feed through the opening. FIG. 2 shows an example of an end cap with an integral link portion 20 and a tether 12. Upon separation of the mating sections 14 and 16, the separated sections are attached to the respective tethers to which they are attached, and in some instances can thereafter be retrieved and reconnected at a later time.

The release apparatus 10 includes components, such as hydraulics, electrical and movable structural elements that operate to cause a separation between the two mating sections, which are contained within a housing comprising one or more outer side walls. Further, in some embodiments, the housing is in a cylindrically shape; however, can be configured in other shapes. Further, the housing provides protection for the internal components from physical abuse as well as the corrosive underwater environment in which at least some embodiments of the release apparatus are intended to operate.

In some embodiments, each of the mating sections 14 and 16, together with their respective link portions 20 are integrally formed as unitary elements. Further, in at least some implementations, the housing, side walls and/or end caps of the mating sections 14 and 16 may be several inches thick, and the release apparatus 10 may in some implementations be 8 feet or more in overall length and may have a weight of about 4000 pounds or more so that it can achieve design breaking loads for some embodiments of greater than a hundred thousand pounds, and with some embodiments achieve design breaking loads of a million pounds or more, for example. It should be understood that multiple release apparatuses can be cooperatively implemented to withstand a cumulative load force. For example, several tethers and release apparatuses 10 (e.g., with working loads of 300,000 pounds or more) may be used to moor or anchor drilling platforms and other massive structures that may be used at sea.

Some embodiments include one or more access plates or panels 24 allowing access to the interior of the respective mating sections. For example, with the mating sections 14 and 16 cooperated, a unitary construction is achieved with the outer side walls providing the primary tension or load-bearing capability. A number of access plates 24, suitably attached by bolts 26, can be provided to permit maintenance and the like of the internal components of the release apparatus. The access plates 24 may include and/or cooperate with one or more gaskets (not shown) provided to make a watertight seal.

FIG. 3 shows a cross-sectional view of an exemplary release apparatus 10, in accordance with some embodiments. In some implementations, the release apparatus comprises a first or activatable mating section 16, and a second or retaining mating section 14. Further, in some embodiments, the activatable mating section 16 comprises one or more control compartments 30 that are substantially water tight, and house electrical modules 32, one or more hydraulic systems 79, hydraulic accumulators 34 and/or storage tanks, one or more hydraulic release valves 36, a hydraulic cylinder or chamber 38 and a piston 40, which in some implementations comprises a piston, as further described below, and/or other such components and typically a combination of such components.

In some embodiments, the electrical modules 32 include one or more wireless communications receivers configured to receive, and in some instances amplify and/or decode, wired and/or wireless communications. In some embodiments, the receiver is configured to receive, amplify and decode an acoustic release command signal that is sent from a command transmitter (e.g., at an oil platform). The receiver is operably connected to one or more of the hydraulic accumulators and/or valve components of the release apparatus 10, and/or to one or more controllers of the release apparatus that in turn is further couple with the one or more of the hydraulic accumulators and valve components, allowing activation to drive the piston 40 to cause the release of the two mating sections 14 and 16 in response to a release command signal being received (e.g., acoustically transmitted from a control station at an oil platform, a bridge of a ship, etc.). It should be understood that the electrical and hydraulic components in the control compartment 30 are shown in schematic and exemplary form.

The activatable mating section 16 further includes a set of movable locking shoes, indicated generally at 56. The locking shoes are secured with the activatable mating section and movable between a first or locked position configured to lock the activatable mating section 16 with the retaining mating section 14 together and a second, disconnected or released position configured to allow the activatable mating section 16 and the retaining mating section 14 to disconnect. FIG. 3 further shows the activatable mating section 16 and the piston 40 in a first, locked or engaged configuration or state. Accordingly, the cam 64 is in a locked position, which in some implementation includes being in contact with the locking shoes 56 maintaining the locking shoes in a locked position. Further, in some embodiments, the cam 64 is maintained by the piston 40 and/or biasing system 39 (e.g., one or more springs, pneumatic piston, etc.).

FIG. 4 shows an enlarged, partial cross-sectional view of the exemplary release apparatus 10, in accordance with some embodiments. In FIG. 4, the activatable mating section 16 is separated from the retaining mating section 14, with the piston 40 in a retracted, disengagement or released position, and the locking shoes 56 in the released position retracted from and not in contact with the retaining mating section 14, such that the release apparatus 10 is in a released state.

Referring to FIGS. 3 and 4, in some embodiments, the side wall of each of the mating sections 14 and 16 is substantially increased in thickness immediately adjacent the line of disconnection 18. For example, the side walls of the mating sections 14 and 16 have, in some embodiments, an inwardly directed annular flanges or locking rings 42 and 44, respectively. The annular flange 42 of the retaining mating section 14 comprises and/or defines the engagement surface 46. Similarly, the annular flange 44 of the activatable mating section 16 comprises and/or defines the angled surface 48. In some embodiments, the angular flanges 42 and 44 extend continuously around the interior surface of the walls of the activatable mating section 16 and retaining mating section 14, respectively. In other embodiments the angular flanges 42 and 44 may be configured with and/or formed by sections that each extend about a subsection of the interior surface of the walls defining multiple portions of the engagement surface 46 and/or the angled surface 48. At the line of disconnection 18, the flange 44 of the activatable mating section 16 has an annular tongue 50 that seats within a cooperatively configured groove 52 in the flange 42 of the retaining mating section 14. Thus, when the two mating sections 14 and 16 are coupled together, the tongue and groove prohibits transverse movement between the two sections.

To hold the two mating sections 14 and 16 together, in some embodiments the locking shoes 56 are provided and positioned generally around an inside of the side walls proximate the line of disconnection 18. It should be understood that while only two of such locking shoes 56 are shown in FIGS. 3 and 4 for the purpose of clarity of illustration, there are additional locking shoes utilized, such as shown in the cross-section of FIG. 5. For example, in some embodiments, eight locking shoes 56 are included, such as illustrated in FIG. 5. Some embodiments may have fewer locking shoes while other embodiments may comprise more. While the number of locking shoes in and of itself is not critical there should be a sufficient number so that extraordinary stress is not focused on any particular locking shoe which may detrimentally affect the structural integrity of the release apparatus as a whole. Further, the size of the locking shoes 56 may vary depending on expected implementation. For example, in some embodiments, the locking shoes may have dimensions of approximately 6 inches wide (W) at a locking surface 57 and a height of about 7 inches.

In some embodiments, each of the locking shoes comprises a locking surface 57 configured to contact an engagement surface 46 of the retaining mating section 14 when the locking shoes are in the locked position and configured to maintain a position of the retaining mating section 14 with the activatable mating section 16. Further, in some embodiments, the locking shoes 56 have a locking portion that comprises a pair of opposed angled surfaces, including the locking surface 57 and angled support surface 58, which in some implementations are separated by a bridge portion 60. Further, the locking shoes typically further include a rocker portion 62 that is radially inwardly curved as shown.

Further, in some embodiments, the release apparatus is configured with the plurality of locking shoes arranged radially about a central or longitudinal axis 25. Additionally, in some implementations, the plurality of locking shoes are configured to pivot such that the locking surface 57 of each of the plurality of locking shoes 56 pivots away from the longitudinal axis 25 when moved or pivoted into the locked position, and alternatively pivots toward the longitudinal axis when moved or pivoted into the release position.

In some embodiments, the release apparatus 10 includes a cam 64 positioned adjacent the locking shoes, and in some implementations has a generally circular shape from an end view thereof. A piston 40 couples with and/or comprises the central cam 64. Further, in some embodiments, the cam 64 is inwardly curved laterally along an outer surface 66. When the release apparatus 10 is in its armed or locked position, shown in FIG. 3, it is seen that the cam 64 is in contact with the bridge portion 60 of the locking shoes 56 and, while in this position, the locking surface 57 and angled support surface 58 contact and/or engage the engagement surface 46 of the retaining mating section 14 and an angled surface 48 of the flanges 42 and 44, respectively, and thereby lock the two mating sections 14 and 16 together. Since the presence of the cam 64 prohibits radial movement of the locking shoes while it is in the locked position (shown in FIG. 3), the mating sections 14 and 16 cannot be separated with the locking portion of the locking shoes 56 maintained in firm and immovable contact with the flanges 42 and 44. In accordance with at least the embodiment depicted in FIG. 3, it is seen that the construction of the release apparatus 10 is such that there is virtually solid material vertically along the line of disconnection 18 when the release apparatus 10 is in its locked or armed position, with the cam 64 and the bridge portion 60 of the locking shoes 56 substantially filling the area between the side walls, which would substantially prohibit radially inward movement of the locking shoes 56 that is necessary for separation of the mating sections 14 and 16 from one another.

In some embodiments, to separate the mating sections 14 and 16 from one another, at least the locking sections of the locking shoes 56 are moved inwardly and out of contact with the engagement surface 46 of the flange 42 of the retaining mating section 14 and the angled surface 48 of the flange 44 of the activatable mating section. To effect this radially inward movement, in accordance with some embodiments, the cam 64 with its one or more curved outer surfaces 66 is retraced (e.g., moved to the right as shown in FIGS. 3 and 4), by the operation of the piston 40 which is attached to the cam by a shaft 70. When the cam 64 is retracted, the one or more curved outer surfaces 66 come in contact with the rocker portion 62 of the locking shoes 56 and cause the rocker portion 62 of each of the locking shoes to be moved toward, and in some instances into contact with, the side walls of the activatable mating section 16. As the rocker portions 62 continue to be moved radially outward in response to further travel and retraction of the cam 64, the locking surface 57 and the angled support surface 58 are moved radially inwardly out of contact with the engagement surface 46 and the angled surface 48 of the flanges to thereby enable release and disconnection of the two mating sections 14 and 16 as shown in FIG. 4. In some embodiments, a spring 39 may be provided in the hydraulic cylinder 38 to exert force against the piston 40 maintaining a position of the cam when in the locked state, and hold the release apparatus 10 in the locked position so that it cannot be disconnected by vibration or other similar effects.

In some embodiments, the release apparatus 10 is activated by wireless communication (e.g., acoustically transmitting signal) comprising a coded release command that is detected and decoded by the electric modules 32 which activate valving and/or the accumulators of the hydraulic system that provides high pressure fluid that drives the piston 40 to a release or disengaged position (e.g., to the right as shown in FIGS. 3 and 4) in the hydraulic cylinder 38 and, by virtue of the shaft 70 connecting the piston to the cam 64, causes the locking shoes 56 to become disengaged from the annular flanges 42 and 44 and permit separation of the mating sections 14 and 16.

Further, in some embodiments, the rocker portion 62 of one or more of the locking shoes 56 also include one or more smaller recesses 72 therein that are configured to cooperatively engage with one or more annular retaining rings 74 that are formed in and/or attached to the side wall of the activatable mating section 16 so that the locking shoes are prohibited from sliding, e.g., to the right as depicted in FIGS. 3 and 4, when the cam is being moved in the same direction. Thus, the permitted movement of the locking shoes 56 is the rocking or pivoting movement. For example, when locking the two mating sections 14 and 16, the rocker portion 62 is moved radially outwardly and the locking portion with the locking surface 57 and inclined surfaces 58 is moved radially inwardly.

In some implementations, the chamber, void or area 41, defined when the 14 and 16 two mating sections 14 and 16 cooperated together, in which the locking shoes 56 and cam 64 are located is sealed from the control area or control compartment 30 by a wall 76 so that water and/or other potential contaminants will not enter the control compartment 30, including after the mating sections have been separated. Some embodiments include one or more o-ring seals (not shown), gaskets, washers, pressure fit structures and/or other sealing mechanisms provided adjacent to and/or around at least the shaft 70 that extends from the control compartment 30 so that water does not enter the control compartment 30 between the shaft and the wall 76. Moreover, one or more lubricants and/or lubricating fluids, such as grease, oil or the like, may be provided within the area housing the locking shoes 56 and cam 64 to further protect the movable components from the corrosive effects of and environment in which the release apparatus is implemented (e.g., an underwater environment).

The release apparatus is configured, in at least some embodiments, to operate in the ocean, and often at depths of greater than 100 meters and in many instances greater than 500 meters, subjecting the release apparatus to increased pressures than at the surface. Some embodiments may allow the chamber 41 in which the locking shoes 56 and cam 64 are located to be equilibrated with an external surrounding sea pressure. This equalizing of pressure can limit or avoid negative pressure or suction that would otherwise have to be overcome during separation of the two mating sections 14 and 16 upon activation of the release. In some embodiments, the chamber 41 is equilibrated by filling the chamber space with water, oil or other substance prior to deployment of the release apparatus. Further, some embodiments include one or more equilibrating valves (not shown) installed in one or both of the mating sections, such as in a domed end (e.g., left side) of the retaining mating section 14. For example, some embodiments include one or more double acting check valves that allow the pressure within the chamber 41 to be equalized with a pressure exterior to the release apparatus and/or equal to an expected pressure.

As described above, in some embodiments, one or more lubricants and/or lubricating fluid, such as grease, oil or the like, may be provided within the area housing the locking shoes 56 and cam 64 to further protect the movable components from the corrosive effects of and environment in which the release apparatus is implemented (e.g., an underwater environment). Further, one or more lubricants may be applied on one or both of the engagement surface 46, locking surface 57, an angled surface 48 and/or angled support surface 58. The lubricant(s) can, in some instances provide protection to these components, and at least in part additionally ease the movement between the surfaces in disengaging the two mating sections 14 and 16.

The coupling between the two mating sections 14 and 16 is configured, in at least some embodiments, to withstand forces (e.g., forces in directions that, but for the structural locking of the two mating sections, would tend to pull the two mating sections away from each other) that are in excess of hundreds of thousands of pounds, and in some instances forces and/or load in excess of a million or more pounds. The movement of the locking shoes 56 results in a gradual decrease in the amount of area of each of the engagement surface 46 and locking surface 57 that are in contact until there is a separation between the engagement surface 46 and locking surface 57. Because of the relatively large forces asserted between the engagement surface 46 and locking surface 57 (e.g., relatively large pressures are distributed over the locking surfaces 57 of the plurality of locking shoes 56 and the engagement surface 46), the movement of the locking shoes 56 can cause increased localized pressures at least between areas of the engagement surface 46 and the locking surface 57 as the amount of area between the engagement surface 46 and locking surface 57 is decreased until there is a separation.

Accordingly, the configuration and/or shape of the locking shoe 56, locking surface 57 and/or the engagement surface 46 can have significant effects on the efficiency of supporting the loads applied to the release apparatus 10, the durability of the release apparatus, the ability to reuse one or both of the retaining mating section 14 and the activatable mating section 16, the useful life of one or both the retaining mating section 14 and the activatable mating section 16, and/or other such factors. Further, in some embodiments, the locking surfaces 57 and/or the engagement surface 46 are configured to inhibit damaging the other of the engagement surface 46 and locking surfaces 57, and/or to aid in the separation between the engagement surface 46 and locking surfaces 57 in response to a release command and movement of the locking shoes 56. In some embodiments, portions of the locking surfaces 57 are tapered and/or curved proximate to lateral sides of the locking surfaces.

Referring to FIG. 5, shown is a cross-sectional view of the release apparatus 10, in accordance with some embodiments, at an axis labeled "5" in FIG. 3. As depicted, in some embodiments, the release apparatus 10 and/or the locking shoes 56 and engagement surface 46 are configured in a generally circular geometry. The circular geometry provides in part an increased contact area when in the locked state. In FIG. 5, the locking shoes 56 are shown in the armed or locked position, and in some instances generally in contact with an inner surface of the outer walls of the mating sections 14 and 16. Further, the locking surface 57 of the locking shoes 56 are engaging the engagement surface 46 of the retaining mating section 14.

Referring to at least FIGS. 3-5, during the pivoting movement of the locking shoes 56 caused by the retracting of cam 64 from the locked position to the released position, the locking end portions of each of the locking shoes 56 (e.g., generally the left end portion as shown in FIGS. 3 and 4) move radially inward toward one another as shown in FIG. 4. Again, in some embodiments, the locking shoes 56 may taper in width, and in some instances the locking shoes 56 have a generally triangularly cross-sectional shape as shown in FIG. 5, which in part allows them to be moved radially inwardly without interfering with one another, particularly in the event a larger number of locking shoes are incorporated, such as eight or more locking shoes.

Figure 6C:
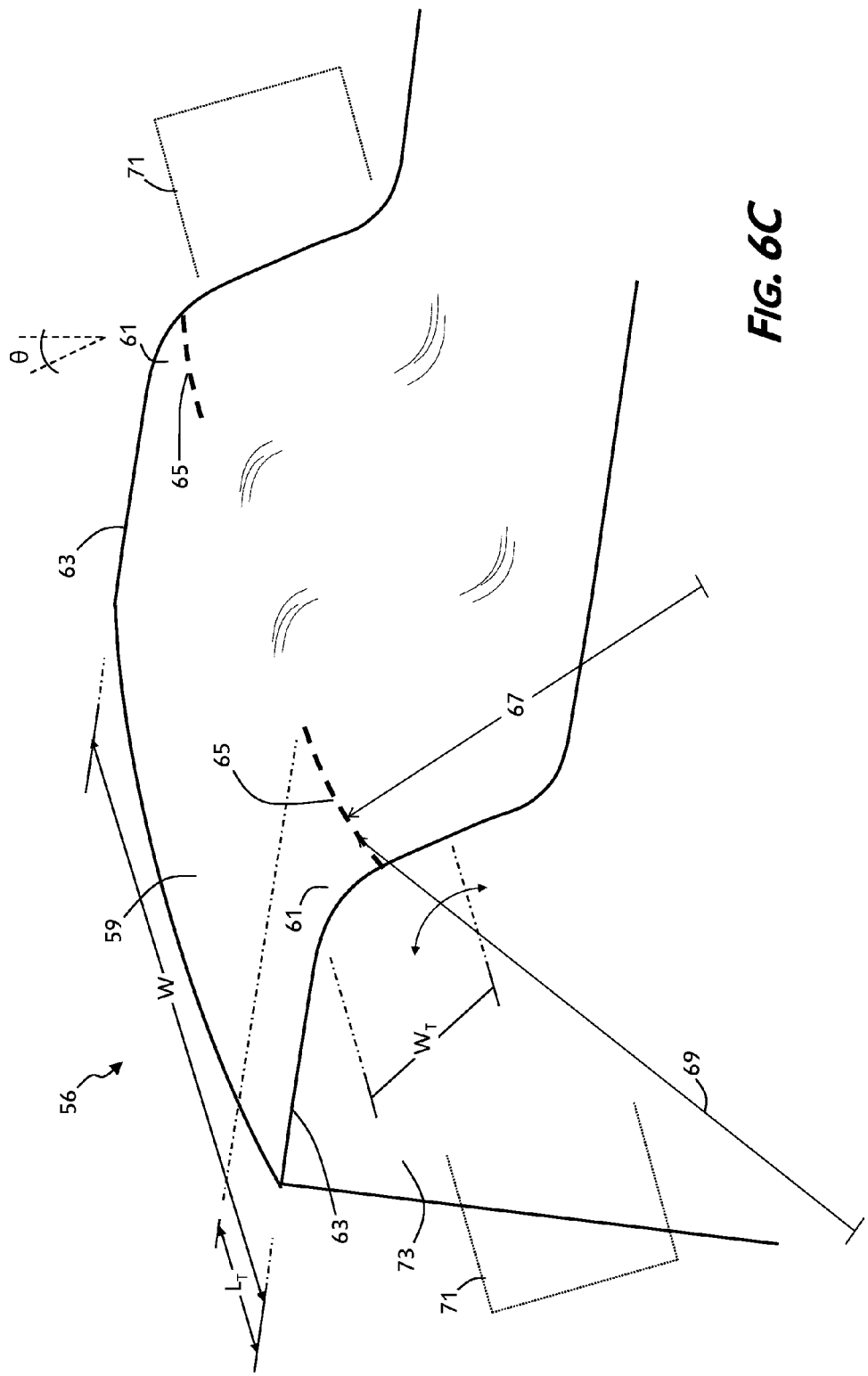
FIG. 6C shows a simplified, perspective view of part of an exemplary locking shoe including an example of a locking surface, in accordance with some embodiments.

FIG. 6A shows a cross-sectional view of an exemplary locking shoe 56, in accordance with some embodiments. FIG. 6B illustrates a simplified perspective view of an alternative exemplary locking shoe 56, in accordance with some embodiments. FIG. 6C shows a simplified, perspective view of part of a locking shoe including the locking surface 57, in accordance with some embodiments. Referring to FIGS. 6A-6C, the locking surface 57, in some embodiments, extends across a width (W) of the locking shoe 56. In some embodiments, the locking surface 57 is generally configured at a contact angle $\theta$ relative to a plane, wherein the plane is generally perpendicular to a central axis of the release apparatus 10 and/or a generally longitudinal axis 51 of the locking shoe (e.g., as depicted in FIG. 6A for example), and in some configurations the plane is perpendicular to the wall of the retaining mating section 14 when the locking shoe is in the locked position. Further, in some embodiments, the locking surface 57 extends into a radially exterior surface 59, and proximate the radially exterior surface 59 the locking surface is rounded, bowed or tapered as it extends into the radially exterior surface. The locking surface 57 of each locking shoe 56 is configured to contact the engagement surface 46 of the retaining mating section 14 when in the locked state maintaining a position of the activatable mating section 16 with the retaining mating section 14 when the locking shoes are in the locked position.

In some embodiments, the locking surface 57 further comprises toric shaped or rounded portions or sections 61, as depicted in FIG. 6C, along portions of lateral edges 63 of the locking shoe 56. In some implementation, the toric shaped portions 61 (generally referred to below as toric portions) have toric geometries. The toric portions 61 are formed and/or machined portions relative to the lateral edges 63 of the locking surface proximate the radially exterior surface 59 and/or as the locking surface extends into the radially exterior surface.

In some embodiments, the toric portions 61 having the toric geometries comprise a shape that tapers away from a plane 71 defined by a main portion of the locking surface 57. Further, the toric portions 61 comprise a curvature 65 defined by an arch or curve. In some implementations, the curvature 65 is defined by a first radius (R) 67. Furthermore, in some embodiments, the toric geometries comprise the curvature 65 defined by the first radius 67 and further defined by that curvature 65 being rotated over a first arch relative and/or about an axis a distance or second radius 69 from the curvature 65. In some instances, the second radius 69 is greater than the first radius 67. In other embodiments, the arch or curve 65 is defined by a parabolic equation.

Accordingly, the toric portions extend over at least some of the locking surface 57 and typically also extend over some of the radially exterior surface 59 and the lateral surfaces 73 of the locking shoes 56. Again, in some embodiments, the extent of the tapering implemented through the incorporation of the toric portions 61 is dictated by the curvature 65 and/or the first radius 67. In some embodiments, a length $L_T$ of the toric portions 61 extending from the lateral edge 63 toward a center of the locking shoe is proportional to the width W of the locking shoe. In some implementations, the length $L_T$ can be between 5%-20% of the width W of the locking shoe, and in many instances is between 10%-15% of the width W of the locking shoe. Similarly, a width $W_T$ of the toric portions extends along a portion of the lateral edges 63. In some implementations, the width of the toric portion $W_T$ is proportional to the width W of the locking shoe, and often is between 5%-20% of the width W, and in many instances is between 10%-15% of the width W. Further, in some embodiments, the length $L_T$ and width $W_T$ of the toric portion can be similar or equal, while in other embodiments they may be different. Further still, in some embodiments, the curvature 65, first radius 67 of the curvature, and/or the second radius 69 are dictated by and/or selected such that a desired length $L_T$, width $W_T$ and/or tapering of the toric portions 61 are achieved. For example, in some implementations, the first radius 67 of the curvature 65 is similar in length and/or equal in length to the width W of the locking shoe 56.

In some embodiments, the toric portions 61 comprise a shape such that the toric portions are not in contact with the engagement surface 46 of the retaining mating section 14 while the two mating sections 14 and 16 are in the locked state with the locking surface 57 in contact with the engagement surface 46. Further, the toric geometry at the lateral edges 63 of the locking surface proximate the radially exterior surface 59 allows the locking shoes 56 to slide along the engagement surface 46 when being disengaged such that the engagement surface slides off the rounded portion of the locking surface with the toric geometries preventing one or more corners and/or edges of the locking shoe from contacting the engagement surface. Instead, in some embodiments, a central portion of the locking surface 57 maintains contact with the engagement surface 46 as the locking surface slides off the engagement surface, with the toric portions providing a gradual tapering away from the central portion such that edges and/or corners at the toric portions are prevented from and/or do not contact the engagement surface as the locking surface separates from the engagement surface.

As described above in accordance with some embodiments, in separating the two mating sections 14 and 16 the locking shoes 56 are radially drawn inward such that the locking surfaces 57 of the locking shoes slide across the engagement surface 46. In some embodiments, during the unlocking activity the locking shoes 56 are pivoted allowing the locking surfaces 57 of the respective locking shoes to retract inwardly and disengage from the engagement surface 46.

The movement and/or pivoting of the locking shoes to disengage the mating sections 14 and 16 causes a change in the relative geometry of the contact area between the locking surface 57 and the engagement surface 46. Typically, the unlocking movement of the locking shoes results in progressively reduced amounts of area of contact between the engagement surface 46 and the locking surface 57, and often results in increased localized pressures at least as the amount of area between the engagement surface 46 and locking surface 57 is decreased until there is a separation. The movement of the locking shoes can, in some instances with locking shoes that do not include the toric portions 61, further result in point contacts of the edges 63, at about the location where the toric portions 61 are otherwise incorporated, and/or corners of the locking surfaces 57 against the engagement surface 46. Such progressively reduced areas of contact and/or points of contact by the edges can result in very high contact pressure at these points of contact, which can potentially prevent actuation resulting in a non-release and/or damage the engagement surface 46 and/or the edges 63 of the locking shoe 56 as the locking surface 57 slides across the engagement surface during disengagement (e.g., result in gouging of the engagement surface and/or locking shoe at contact points).

The toric portions 61 and/or tapering, however, allow for a smoother or more fluid sliding between the engagement surface 46 and the locking surface 57 during disengagement and can limit or prevent damage to one or both of the engagement surface 46 and the locking surface 57. Further, the tapering of the toric portions can allow disengagement at greater forces and/or pressures on the release apparatus 10 while still limiting and/or preventing such gouging of the engagement surface 46 and/or other damage to the engagement surface, locking surface and/or the annular flanges 42 and 44. In some implementations to prevent this gouging and non-release, loads on the release apparatuses are reduced prior to disengaging the two mating sections 14 and 16, which in part can mitigate damage to the engagement surface and/or locking shoes. Still further, in some embodiments, the toric portions 61 of the locking surface prevent one or more corners and/or edges of the locking surface 57 from contacting the engagement surface 46 even as the locking shoes 56 move radially inward away from the engagement surface sliding radially along the engagement surface and eventually separating allowing the mating sections 14 and 16 to separate. Additionally, in some embodiments the toric portions 61 allow an increased or maximum contact area to be maintained at the point of release.

Still referring to at least FIGS. 6A-6C, as described above, in some embodiments, at least a portion of the locking surface 57, and typically at least a majority of the locking surface is generally configured at a contact angle θ relative to a plane, wherein the plane is generally perpendicular to a general longitudinal axis 51 of the locking shoe and/or generally perpendicular to a central or longitudinal axis 25 of the release apparatus 10 when the locking shoes are in the locked position. Similarly, in some instances, the contact angle is defined relative to a plane that is perpendicular to the side wall of the retaining mating section 14 when the locking shoe is in the locked position. Further, in some implementations the engagement surface 46 is configured such that at least a portion of the engagement surface 46 of the retaining mating section 14, and typically a majority of the engagement surface 46 is inversely angled at an inverse contact angle ($\theta_I$) to coincide with the contact angle θ where the numerical value of the two angles θ and $\theta_I$ are substantially equal relative to orientation.

The contact angle θ, and an inverse contact angle $\theta_I$ of the engagement surface 46, is selected to achieve a desired balance of forces to support the opposing forces on the two mating sections 14 and 16 while allowing the locking shoes to be pivoted to disengage the locking surface 57 from the engagement surface 46 in response to a release command. Additionally, in some embodiments, the contact angle is selected to achieve a desired balance of forces to support the opposing forces on the first and second mating sections while allowing the plurality of locking shoes to be moved in response to pressure by and/or onto the cam 64 to cause the movement of the locking shoes to disengage the locking surface 57 from the engagement surface 46 in response to a release command.

Generally, the contact angle θ or angle of contact between the locking surface 57 and the engagement surface 46 under load can have a significant effect on the forces needed to maintain the release apparatus 10 in the locked state and/or the amount of force needed to pivot the locking shoes 56 to the released or disengaged position allowing the two mating sections 14 and 16 to separate. The contact angle θ between the locking surface 57 and the engagement surface 46 under load can result in excess forces (e.g., generally in a direction perpendicular to the longitudinal axis 25 of the release apparatus, and thus generally parallel to the direction of pivot of the locking shoes) that may tend to inhibit or prevent the locking shoes 56, and thus the locking surfaces, from moving inwardly. Similarly, variations in the contact angle may alternatively cause excess radial forces (e.g., generally perpendicular to a longitudinal axis of the locking system, and thus in the direction of pivot of the locking shoes) that tend to force the locking shoes 56 in a direction radially inward. Accordingly, the locking shoes of some embodiments are configured with a contact angle θ of the locking surface 57 that generally balances the longitudinal forces and radial forces to maintain the locking shoes in the locked position while avoiding excess forces in the longitudinal direction or radial direction that would have to be overcome to pivot the locking shoes. Further, the balancing of these forces typically also takes into consideration friction forces between the engagement surface 46 and the locking surfaces 57.

As also described above, in some embodiments one or more lubricants can be utilized within the release apparatus 10, such as on and between the locking surface 57 and the engagement surface 46. The introduction of one or more lubricants and/or the type of lubricant or lubricants utilized can affect the balancing of the forces, for example, due to a change in a coefficient of friction. In some embodiments, the locking surface 57 can be configured with a contact angle θ of about 30 degrees ±3 degrees relative to a plane that is perpendicular to the longitudinal axis 25 when the locking shoes are in the locked position. In other embodiments, however, the contact angle θ may vary from the 30 degrees depending on changes in friction coefficients as a result in a use of one or more types of lubricant that may be applied.

For example, in some instances the locking surfaces 57 of the locking shoes 56 can be configured and/or machined with contact angles θ of about 30 degrees with a first type of lubricant and/or no lubricant to achieve a desired balance of the forces pushing the locking shoes radially inward and preventing the locking shoes from moving inwardly. In other implementations with one or more additional or alternative lubricants, however, a contact angle θ of about 30 degrees may result in an excessive inward force of the locking shoes under load. For example, some embodiments utilize one or more lubricants between the locking surface 57 and the engagement surface 46 that provides a coefficient of friction defined by a ratio of a force of friction between the locking surface and the engagement surface and a force pressing the locking surface and the engagement surface together that is less than 0.50

As another example, some embodiments utilize one or more lubricants between the locking surface 57 and the engagement surface 46 that provides a coefficient of friction that is about 0.30. Accordingly, some embodiments utilize locking shoes 56 that have locking surfaces 57 formed at a contact angle θ of about 21 degrees ±3 degrees from a plane perpendicular to an axis 51 of the locking shoe and/or perpendicular to the longitudinal axis 25 of the release apparatus when the locking shoes are in the locked position and one or more lubricants are utilized that provide a coefficient of friction of about 0.30±10%. At this coefficient of friction, the contact angle of the locking surface balances forces to support the opposing forces on the two mating sections 14 and 16 while allowing the locking shoes 56 to be pivoted to disengage the locking surface 57 from the engagement surface 46 in response to a release command. Further, in some embodiments the locking surfaces of each of the plurality of locking shoes is formed with the contact angle at about 21 degrees from the plane perpendicular to a general longitudinal axis of the locking shoe and/or a longitudinal axis of the release apparatus when the locking shoe is in the locked position resulting in a balancing of forces to support the opposing forces on the first and second mating sections while allowing the plurality locking shoes to be moved in response to about 40,000 pounds ±25% of force by the cam 64 to cause the movement of the locking shoes to disengage the locking surface 57 from the engagement surface 46 in response to a release command.

Further, some implementations take into consideration forces provide by a biasing system or device (e.g., a spring 39, friction force, release tabs, etc.) to hold the cam 64, and thus the locking shoes 56, in the locked position so that it cannot be disconnected by vibration or other similar effects. Accordingly, the contact angle θ may further be dependent on the forces applied and/or that must be overcome based on the biasing system.

FIG. 7 illustrates a simplified schematic diagram of an exemplary hydraulic system 79 utilized in the release apparatus 10, in accordance with some embodiments. The hydraulic system 79, in some implementations, includes one or more hydraulic accumulators 34 each configured to release a hydraulic fluid into the hydraulic cylinder 38. Typically, the hydraulic system includes two or more hydraulic accumulators 34 each individually configured to provide a requisite pressure to drive the piston 40 within the hydraulic cylinder 38 at least a predefined distance from a locked position to a release position. One or more hydraulic release valves 36 (e.g., solenoid valve, poppet type solenoid valve, latching valve, or other such valves) are included in the hydraulic system. In some embodiments, one or more hydraulic solenoid release valves 36 cooperate with each of the one or more accumulators 34. Typically, the release valves 36 are located within the hydraulic circuit that extends to the hydraulic cylinder 38 through conduits 80 downstream of each of the solenoid valves. Further, in some implementations, the conduits 80 downstream of each of the solenoid valves are combined in a single flow path into the hydraulic cylinder. The redundancy within the hydraulic system increases reliability of the operation of the release apparatus 10. Upon activation in response to a release command, hydraulic fluid is released from the hydraulic accumulators and/or the hydraulic accumulators can be activated by triggering the release valves 36 that permit pressurized hydraulic fluid (e.g., oil) to flow from the accumulators to the hydraulic cylinder 38. The hydraulic fluid induces a pressure and/or force on the piston 40 causing the piston 40 to move. The movement of the piston is transferred through the shaft 70 to induce movement of the cam 64. The movement of the cam causes the locking shoes 56 to move to the open position (e.g., causes the locking portion and locking surfaces to pivot and retract radially inward, see FIG. 4) freeing the retaining mating section 14, which for example may be secured with an anchor end locking ring causing a release of an anchor line.

In some embodiments, the hydraulic system 79 further comprises a leak valve 82 that is configured to provide a controlled leak within the hydraulic system so that a leak in the one or more release valves 36 and/or other valving will not result in pressure being gradually built up within the conduit 80 and/or hydraulic cylinder that could inadvertently and/or accidently activate the release apparatus 10. Thus, a leak will not produce an undesirable premature or false activation of the release apparatus. Typically, the leak valve 82 is not a pressure valve since an actual command to activate the release mechanism will result in at least one of the hydraulic accumulators 34 and release valves 36 releasing high pressure fluid into the conduit 80 and the high pressure fluid flows to the hydraulic cylinder 38 without appreciable pressure loss due to the presence of the controlled leak provided by the leak valve 82. As such, the leak valve 82 in accordance with some embodiments provides a slow acting control pressure bleeding function to prevent gradual buildup of dangerous pressures within the conduit 80 and/or hydraulic cylinder, but does not otherwise interfere with a sudden release of the high pressure fluid by the controlled actuation of the release apparatus 10 in response to a release command signal generated by and received from a remote transmitter at a control station or the like.

FIG. 8A illustrates a simplified block, schematic diagram of an exemplary hydraulic system 79 in a locked state utilized in the release apparatus 10, in accordance with some embodiments. FIG. 8B shows a partial view of the exemplary hydraulic system 79 of FIG. 8A in a release or activated state, in accordance with some embodiments. Referring to FIGS. 8A and 8B, the hydraulic system 79, in some embodiments, includes one or more hydraulic accumulators 34, one or more hydraulic release valves 36 (e.g., solenoid valves, latching valves, poppet type solenoid valves, or other such valves), hydraulic conduits 80 that couple the hydraulic fluid to the hydraulic cylinder 38, and one or more bypass valves 84, switches or other such protection device(s). Further, some embodiments include one or more hydraulic locking valves 87, and one or more hydraulic receivers 88. As described above, the release apparatus is configured, in at least some embodiments, to operate in the ocean, and often at depths of greater than 500 meters, subjecting the release apparatus to increased pressures than at the surface. This pressure can act on the piston rod 70 which force is transmitted to the cam 64 and tries to force the cam to the release position. Some embodiments, however, include the spring 39 to help compensate for this pressure. Further, some embodiments establish a back pressure or pre-charge pressure within the hydraulic cylinder 38 from the receiver forcing the plunger 40 toward the locked position. The pre-charge can be substantially any pressure to compensate for opposing pressures.

The bypass valve 84 is typically coupled along the conduit 80 between one or more of the release valves 36 and the hydraulic cylinder 38. In some implementations, a second or redundant bypass valve (not shown) is included in the hydraulic system 79, and in some instances is positioned parallel with the bypass valve 84. Some embodiments additionally include one or more check valves 86 cooperated with the bypass valve and/or redundant bypass valve. Further, in some implementation, the hydraulic system 79 may optionally include one or more leak valves 82.

Typically, the hydraulic system 79 includes two or more hydraulic accumulators 34. The hydraulic accumulators cause hydraulic fluid to be supplied to and/or injected into the hydraulic cylinder. In some embodiments, each of the two or more hydraulic accumulators is configured to individually provide a requisite pressure to drive the piston 40 positioned or seated within the hydraulic cylinder 38 between the locked and the released positions. Accordingly, in some embodiments the hydraulic system induces force in response to the release command configured to cause the cam to move causing the movement of the locking shoes between the locked position and the release position.

In some embodiments, each of the hydraulic accumulators 34 couples with one or more hydraulic solenoid release valves 36 located within the hydraulic circuit that extends to the hydraulic cylinder 38 through the conduits 80 downstream of each of the solenoid valves. In some implementations, the conduits 80 downstream of each of the release valves are combined in a single flow path into the hydraulic cylinder. The hydraulic system 79 can take advantage of redundancy within the hydraulic system to increase reliability of the operation of the release apparatus 10.

In the locked or coupled state with the two mating sections 14 and 16 secured together, the release valves 36 are closed preventing hydraulic fluid maintained in the accumulators 34 from entering the conduits 80 and the hydraulic cylinder 38, resulting in relatively low pressure within the conduits compared to when the hydraulic fluid is driven through the conduits 80 and into the hydraulic cylinder 38. The one or more bypass valves 84 are typically maintained in an in-line or open state while the release apparatus 10 is in a locked state. As such, in the event of a leak within the hydraulic system from one or more of the hydraulic accumulators 34, the fluid readily flows through the bypass valve 84, and in some instances out of the hydraulic system 79. This extraction of the leaked hydraulic fluid prevents fluid buildup in the hydraulic cylinder 38 that could result in dangerous pressures that could cause an undesirable premature or false activation of the release apparatus. Again, some embodiments include a check valve 86 that in part inhibits contaminants from entering the hydraulic system. For example, one or more check valves 86 can couple with the bypass valve and be configured to allow the leaked hydraulic fluid to be released from the hydraulic system (e.g., into a sealed control compartment 30 of the activatable mating section 16) while preventing contaminants (e.g., water, oil, lubricant, dirt and/or other contaminants) that are outside of the hydraulic system from entering the hydraulic system through the one or more bypass valves 84.

Further, the bypass valve 84 is configured with a pressure trigger and/or control loop that activates and closes the bypass valve in response to pressure within the conduit 80 that exceeds a release command threshold pressure. For example, in some embodiments the bypass valve comprises one or more spring-loaded valves, diaphragms or the like, and while the pressure remains below the release command threshold pressure the bypass valve remains open allowing leaked fluid to be extracted from the conduit 80, and closes when fluid pressure exceeds the release command threshold. As such, the bypass valve 84 is configured to close under high flow and/or relatively high pressure conditions and not allow hydraulic fluid bypass to occur through the bypass valve 84 and/or preventing subsequent hydraulic fluid from passing through the bypass valve when the release apparatus 10 is activated to cause a release between the mating sections 14 and 16. For example, the operating pressure of the hydraulic system stored in the accumulators 34 may, in some implementations, be about 5,000 psi and the trigger pressure to close the bypass valve 84 may be about 50 psi. In some embodiments, the leak valve 82 may also have a trigger pressure that is about 50 psi. The closing of the bypass valve prevents the bypass valve from interfering with the sudden release of the high pressure fluid by the controlled actuation of the release apparatus 10 in response to a release command signal generated by and received from a remote transmitter at a control station or the like. The hydraulic system 79 illustrated in FIGS. 8A and 8B show a single bypass valve 84 and check valve 86. Some embodiments, however, include more than one bypass valve and/or check valve, which in some instances may be coupled to a separate conduit 80 that cooperates a separate accumulator 34 with the hydraulic cylinder 38.

Again, the bypass can be implemented through one or more valves, tubes (e.g., capillary tubes), and/or other such devices. For example, some embodiments include one or more capillary tubes in place of or in combination with the bypass valve 84. Similar to the bypass valve, the one or more capillary tubes draw low flow leaked hydraulic fluid from the hydraulic system 79 while the release apparatus 10 is in the locked state and the pressure within the conduit is relatively low. Further, the one or more capillary tubes further allow sufficient pressure to be established within the hydraulic cylinder 38 to drive the piston and thus the cam 64 to shift the locking shoes and cause the release between the two mating sections 14 and 16. Some embodiments further include a diagnostic system that tracks one or more conditions of the release apparatus and is configured to communicate operating parameters and/or conditions over wireless communication (e.g., an acoustic link). For example, in some embodiments, the diagnostic system may comprise one or more sensors that track the pressure within the accumulators. In other embodiments, the communication of the sensor information is communicated and an evaluation of the sensor information is performed remote from the release apparatus (e.g., at an oil rig). An alert can be communicated and/or activated when pressure within one or both of the accumulators drops below a predefined trigger or switch setting threshold. For example, some embodiments determine whether a pressure within one or both the accumulators is above a preset switch setting threshold (e.g., about 4300 psi in some implementations).

As described above, the spring 39 within the hydraulic cylinder 38 and the pre-charge (e.g., nominally 100 psi), which in some instances is established by a locking hydraulic fluid supplied by the one or more hydraulic receivers 88, are included in some embodiments in attempts to assure that the piston 40, the piston shaft 70 and the cam 64 remain in the fully locked position. At deep depths (e.g., greater than 100 meters, and often deeper than 500 meters) the external sea pressure could overcome the spring force and hydraulic pre-charge in the hydraulic receiver 88, which could cause the cam to move. Some embodiments, in attempts to prevent the possibility of this happening, include one or more hydraulic locking valves 87. In some implementations, the one or more locking valves 87 are installed in the hydraulic circuit connecting the back side of the piston in the hydraulic cylinder 38 to the hydraulic receiver 88 and blocks the locking hydraulic fluid (e.g., oil) from passing to the hydraulic receiver 88.

Upon operation of the release, which typically includes the activation of the one or more hydraulic release valves 36 that admit high pressure hydraulic fluid from the accumulator to the front of the piston 40, the one or more locking valves 87 can also be activated to admit the hydraulic fluid from the back side of the piston 40 to be released to the hydraulic receiver 88. This reduces the pressure on the backside of the piston allowing the piston to more easily move into the release position and moves the cam to cause the locking shoes to move to the release position. In some embodiments, one or more hydraulic release valves 36 can be combined with one or more locking valves 87, for example, in an integrated unit, so that the valves will operate from one electrical operator and/or activation command, and in some instances simultaneously operate. In some embodiments, one or more locking valves couple with the hydraulic cylinder and are configured to maintain the locking hydraulic fluid within the hydraulic cylinder to maintain a backside pressure within the hydraulic cylinder inhibiting movement of a piston within the hydraulic cylinder toward an open position when the first mating section and the second mating section are in a locked configuration with the first mating section releasably secured with the second mating section. For example, the one or more locking valves can be maintained in a closed or locked state inhibiting and/or preventing the locking hydraulic fluid from passing to the receiver 88. The one or more locking valves are typically further configured, in some implementations, to transition to an open state in response to the release command allowing the locking hydraulic fluid to be released from the hydraulic cylinder and releasing the backside pressure.

Figure 9:
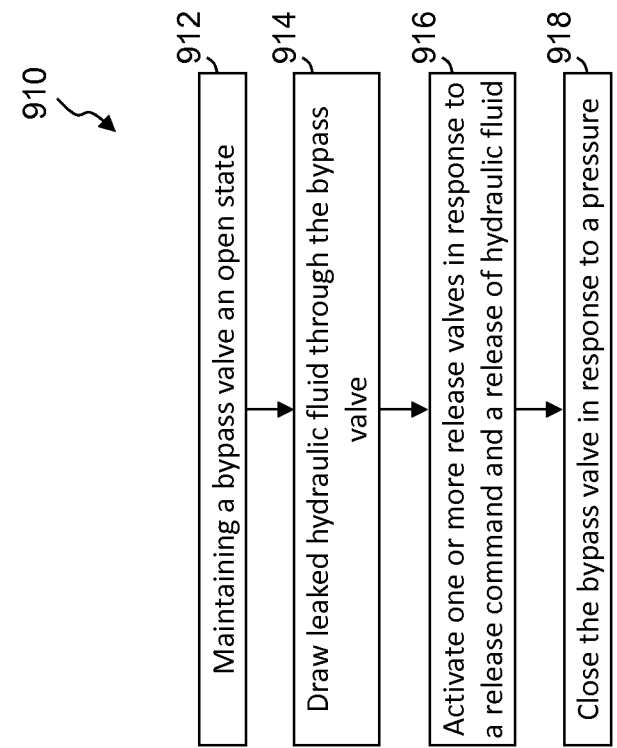
FIG. 9 shows a simplified flow diagram of an exemplary process of implementing a release apparatus and releasably securing two tethers each extending to different objects, in accordance with some embodiments.

FIG. 9 shows a simplified flow diagram of an exemplary process 910 of implementing a release apparatus 10 and releasably securing two tethers each extending to different objects, in accordance with some embodiments. In step 912, a bypass valve of a hydraulic system of a release apparatus is maintained in an open state. In step 914, leaked hydraulic fluid within the hydraulic system is drawn, directed, and/or allowed to pass through a bypass valve, such as bypass valve 84, to drain the hydraulic fluid from a conduit 80 with which the bypass valve couples while the bypass valve is in the open state. Directing the leaked hydraulic fluid avoids a pressure within the hydraulic cylinder 38 coupled with the conduit from exceeding a cylinder pressure threshold that is configured to cause movement of the piston 40 and/or the locking shoes to transition from a locked position to a released position, which allows a separation of the activatable mating section 16 from the retaining mating section 14.

In step 916, one or more release valves 36 are activated in response to a release command to release hydraulic fluid under pressure into the conduits) 80 to flow into the hydraulic cylinder 38. Further, the hydraulic fluid of the hydraulic system, in response to the release command, induces a force on the cam 64 cooperated with the hydraulic system and positioned adjacent the plurality of the locking shoes 56. Again, typically the hydraulic fluid is directed into the hydraulic cylinder 38 driving the piston 40 from a locked position to a released position. The shaft 70 transfers the force or movement of the piston to the cam 64. The force on the cam 64 induces movement of the cam in response to the force and causing the movement of the locking shoes between the locked position and the release position.

In step 918, the bypass valve is closed in response to a pressure within the conduit exceeding a hydraulic threshold in response the release of the hydraulic fluid into the conduit. Again, the closing of the bypass valve prevents subsequent hydraulic fluid from exiting through the bypass valve. In some embodiments, the leaked hydraulic fluid passed through the bypass valve 84 is released through a check valve 86 coupled with the bypass valve and out of the hydraulic system 79. As described above, contaminants from outside of the hydraulic system are prevented by the check valve 86 from entering the hydraulic system and/or through the bypass valve 84.

Further, some embodiments maintain a redundant bypass valve (not shown) in an open state. The redundant bypass valve couples upstream along the hydraulic conduit or a separate conduit from the hydraulic cylinder. Typically, the redundant bypass valve is coupled in parallel with the bypass valve 84. Similar to the bypass valve 84, hydraulic fluid leaked within the hydraulic system is drained and/or otherwise directed through the redundant bypass valve to drain the hydraulic fluid from the conduit such that pressure within the hydraulic cylinder coupled with the conduit does not exceed the cylinder pressure threshold. In some implementations, the cylinder pressure threshold corresponds to the pressure to induce movement of the piston 40 and thus the cam 64. Further, the redundant bypass valve is closed in response to the pressure within the conduit exceeding the hydraulic threshold in response the release of the hydraulic fluid into the conduit. The closing of the redundant bypass valve prevents subsequent hydraulic fluid from exiting through the redundant bypass valve.

As described above, in some embodiments, the release apparatus or mechanism 10 is configured to operate in extreme environments and conditions. For example, in some implementations, the release mechanism is configured to operate in the Arctic Ocean at temperatures at or below freezing. Further, in some embodiments, the release apparatus 10 is configured to resist separation when opposing separation forces are applied that result in hundreds of thousands of pounds of force applied to the two mating sections 14 and 16, and some implementations are configured to withstand opposing forces and/or load of over a million pounds. Accordingly, the release apparatus 10 and the components of the release mechanism are designed and constructed to accurately operate under these and other extreme environments and conditions. For example, the locking shoes 56 are constructed from carbon steel, alloy steel, or other such material. In some embodiments, the locking shoes 56 are constructed from a heat treated alloy steel, such as an AISI and/or SAE alloy E4140 steel, 4340 alloy steel, 4330 alloy steel or other such relevant alloy. Further, the locking shoes 56 in some embodiments are formed and/or conditioned in accordance with a sequence or process in order to achieve desired characteristics to allow the locking shoes to be utilizes in the release apparatuses 10 while operating in expected extreme environments and conditions.

In some embodiments, the locking shoes 56 and/or other components of the release apparatus are subject to a conditioning process which includes a heat treating process applied to at least the locking shoes 56 of the release apparatus 10 to achieve a toughness while retaining a strength and hardness of the alloy steel or other alloy. For example, in some embodiments, the locking shoes are subject to a carburizing of the surfaces of the locking shoes at a temperature of about 1600-2100° F. The heated shoes can then be quenched, for example in a liquid at room temperature. Some embodiments preform multiple or a series of tempering procedures. For example, a first tempering may be performed at about 900° F. followed by reducing the temperature before tempering a second time at a higher temperature (e.g., about 1300° F.) followed again by reducing the temperature (e.g., retuning the locking shoes to room temperature). The heat treating procedure can be followed, in some instances, by a flame hardening of one or more portions of one or more surfaces of the locking shoes, and in some instance flame hardening some or all of the surfaces of the locking shoes. For example, a flame hardening at about 1550° F. is performed on one or more surfaces followed by a polymer quench. Some embodiments further apply a third tempering (e.g., at about 700° F.), which can at least help in achieving a desired surface hardness. Accordingly, some embodiments employ one or more heat treating procedures to achieve desired toughness and/or lack of brittleness (e.g., in accordance with a Charpy-V-test (CNV) values) while retaining desired strength and/or hardness of these steels when operating in at least predicted low temperature conditions (e.g., within Arctic environments and/or the Arctic Ocean).

Figure 10:
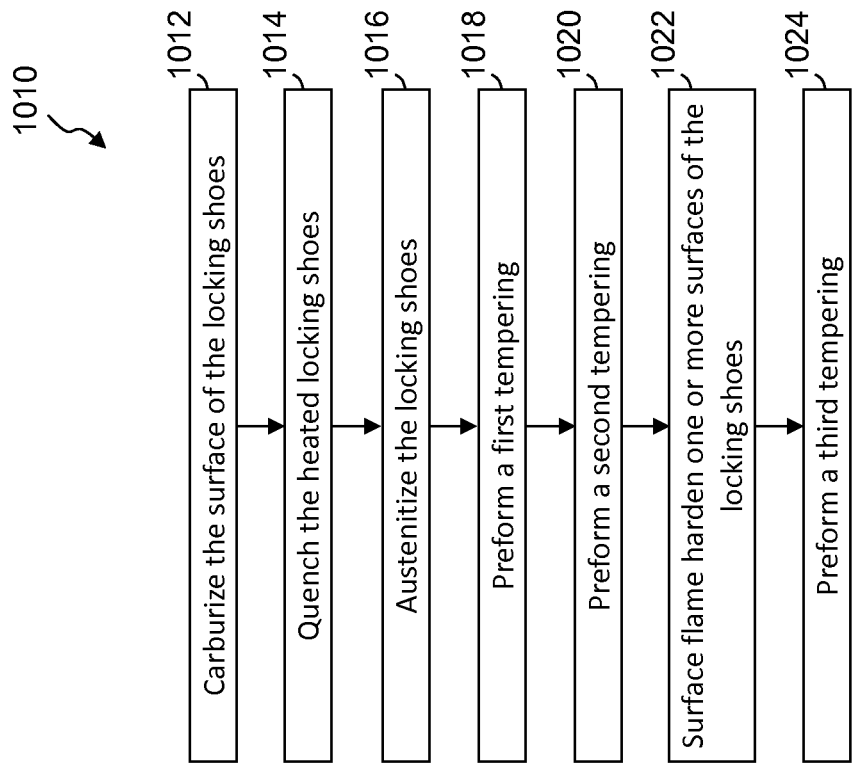
FIG. 10 illustrates a flow diagram of an exemplary process of conditioning, manufacturing and/or machining one or more locking shoes and/or other components of a release apparatus, in accordance with some embodiments.

FIG. 10 illustrates a flow diagram of an exemplary process 1010 of conditioning, manufacturing and/or machining one or more locking shoes 56 and/or other components of a release apparatus 10, in accordance with some embodiments. As described above, in some embodiments, the locking shoes are configured to be utilized in release apparatuses that are intended for use within the ocean, and in many instances in temperatures that are below 5° C. and often below 0° C. Further, the locking shoes in some embodiments are configured so that multiple locking shoes are configured to be cooperatively implemented to withstand at least a hundred thousand pounds of force and in some instances over a million pounds. Accordingly, some embodiments implement the process 1010 to condition the locking shoes and/or other components of the release apparatus to achieve desired strength and toughness to effectively operate in the intended operating conditions.

In step 1012, one or more locking shoes 56 are heat treated and/or carburized while exposed to one or more relatively high carbon-bearing sources (e.g., one or more gases and/or plasmas). This provides a carburization of the surface area of the locking shoe to a desired depth. The depth may vary depending on desired results and is dependent on the temperature of the heating, and the duration the locking shoe is heated and exposed to the carbon-bearing source(s). The exposure to the one or more relatively high carbon-bearing sources allows an endothermic atmosphere to be created. For example, in some implementations, natural gas or at least a methane gas is sourced into the furnace, oven or other device and the locking shoes are heated. Typically, air is be extracted from the furnace prior to heating. Further, the carburization is performed, in some embodiments, at temperatures of greater than 1800° F. in the endothermic atmosphere.

In step 1014, the locking shoe is quenched to reduce the temperature of the locking shoe to a desired reduced temperature. In some implementations, the quenching comprises submerging or otherwise exposing the locking shoes to an oil quench bringing the shoe back down to room temperature. In some embodiments, an optional additional carburizing is performed to achieve carbon penetration to a desired depth. In step 1016, the locking shoes are austenitized at a predefined temperature for a predefined duration. For example, in some embodiments, the locking shoes are austenitized at a temperature that is greater than about 1400° F., such as at a temperature between about 1500° F. and 1600° F. Further, in some implementations, the locking shoes are quenched as part of or following the austenitization. For example, some embodiments perform a quenching within an oil bath following the austenitization for a predefined duration.

In step 1018, a first tempering is performed on the locking shoe at a first temper temperature for a first temper duration. In step 1020, a second tempering is performed on the locking shoe at a second temper temperature for a second temper duration. In some embodiments, the second tempering temperature is greater than the first tempering temperature. The second tempering maintains a hardness of the locking shoes while reducing a brittleness. For example, in some embodiments, the locking shoes are tempered at a first tempering temperature that is greater than 800° F. for a first tempering duration that is greater than one hour, and typically at least about two hours. Further, the second tempering, in some embodiments, is performed at a second tempering temperature that is greater than 1100° F., and typically greater than 1200° F., for a second tempering duration that is greater than one hour and typically at least about two hours.

In step 1022, one or more surfaces of the locking shoe are flamed hardened, and typically flame hardened following the second tempering. In some implementations, this flame hardening comprises a further austenitization of those surfaces treated at a temperature between about 1525° F. and 1575° F. followed by a quenching using a progressive flame hardening torch with integrated quench capabilities. For example, some embodiments preform the quenching with a mix of a polymer and water that is sprayed on the flame hardened portion of the locking shoe. The duration and amount of the quenching material that is applied can depend on many factors, including a temperature to which the portion of the locking shoe is trying to be reduced. In some instances, a polymer and water mixture is sprayed on one or more parts of the locking shoe following flame hardening for 1-5 seconds or until the temperature of the portion of the locking shoe drops below 400° F.

In step 1024, a third tempering is performed on the locking shoe at a third temper temperature for a third temper duration. For example, in some implementations the locking shoes are tempered at a third tempering temperature that is between about 500° F. and 700° F., for the third tempering duration that is greater than one hour and in some embodiments at least about two hours. In performing the process 1010, the locking shoes and/or one or more of the surfaces of the locking shoes are treated to achieve a desired high strength and toughness, while reducing the brittleness of the locking shoe and achieving a desired fatigue strength, at least with respect to low temperature conditions.

Example

Below is an example of an implementation of the heat treating process 1010, in accordance with some embodiments. One or more locking shoes, and typically a plurality of locking shoes are spaced on one or more racks or the like and positioned within an oven that includes calibrated thermocouples (e.g., a GM Enterprise endothermic oven, model GMA242436), with a temperature controller (e.g., from Honeywell International, Inc.). In some implementations, the locking shoes are cleaned (e.g., using a solvent) and labeled. The locking shoes are formed from a SAE alloy E4140 steel or similar alloy comprise 0.38-0.43 Carbon, 0.75-1.00 Manganese, 0.20-0.35 Silicon, less than or equal to 0.04 Phosphorus, less than or equal to 0.04 Sulfur, 0.80-1.10 Chromium, and 0.15-0.25 Molybdenum.

In step 1012, the oven is closed and an endothermic atmosphere is created (e.g., through a natural gas Lindberg 500 CFH generator) by extracting air and introducing methane gas, and the locking shoes are carburized by bringing the oven to a temperature of approximately 1900° F. (±50° F.) for a duration to achieve a carburization to a depth of about 0.5-2 mm. In some instances, the carburization duration is at least about 2 hours (+0.5 hours) once the temperature in the oven reaches the carburization temperature (e.g., 1900° F.). In step 1014, the locking shoes are quenched in a well stirred oil bring the locking shoes to room temperature (e.g., about 60-90° F.). In some embodiments, an optional step is performed to further carburize the locking shoes such that carburization to a case depth of about 0.03 inches is achieved for one or more surfaces.

In step 1016, the locking shoes are austenitized at a temperature of 1550° F. (±25° F.) in a neutral endothermic atmosphere for at least 90 minutes (+15 minutes). In some embodiments, the neutral endothermic atmosphere is achieved by supplying nitrogen into the furnace, and typically substantially filling the furnace with nitrogen. The locking shoes are then quenched in an agitated oil bath, and in some instances brought back to room temperature (e.g., about 60-90° F.). In some implementations, the locking shoes are degreased using a solvent cleaner.

In step 1018, the first tempering is performed in air atmosphere, with the oven raised to a temperature of about 900° F. (±15° F.) for a duration of between about 2 and 3 hours. The locking shoes are then removed from the oven and allowed to air cool to room temperature (e.g., about 60-90° F.). In step 1020, the second tempering is performed in air atmosphere, at a temperature of about 1300° F. (±15° F.) for a duration of between about 2 and 3 hours. The locking shoes are then removed from the oven and again allowed to air cool to room temperature (e.g., about 60-90° F.).

In step 1022, the surface flame hardening is performed of some or all of the surfaces of the locking shoes. For example, some embodiments apply the flame hardening to at least the locking surface 57. Some implementations further flame harden at least the angled support surface 58. During the flame hardening, a progressive flame hardening torch with integrated quench capabilities is used to austenitize the relevant surfaces at a temperature of about 1550° F. (±25° F.) and quenched. Some embodiments expose the surfaces to be flame hardened to an intense flame for a 2-15 seconds, often less than 10 second, to bring the surface temperature up to the desired temperature (e.g., 1550° F. (±25° F.)) followed substantially immediately by the quenching (e.g., water, polymer and water, etc.) spray. Typically, the flame hardening followed by the quenching is rapid enough to avoid an interior of the locking shoe get hot and limiting the hardening during flame hardening to the surface(s). In step 1024, the third tempering is performed in air atmosphere, with at a temperature of about 600° F. (±15° F.) for a duration of between about 2 and 3 hours. The locking shoes are then removed from the oven and again allowed to air cool to room temperature (e.g., about 60-90° F.).

Accordingly, some embodiments forge, treat and/or condition the locking shoes and/or other components of the release apparatus 10. The conditioning can be performed to achieve desired high strength and toughness, lack of brittleness, and good fatigue strength in low temperature conditions (e.g., in the Arctic environs). Again, some embodiments use high strength steel in the chromium-molybdenum (chrome moly family) alloy, such as alloys 4140, 4340 or 4330, nickel-chromium-molybdenum alloy, molybdenum alloy, or similar steel alloys to achieve desire strength characteristics. Often, however, these steel alloys typically exhibit inadequate toughness (e.g., e.g., based on commonly used Charpy V Notch (CVN)) at relatively low temperature (e.g., below 5° C. and in some instances below –5° C.), and as such may be unsatisfactory for some expected load conditions the locking shoes 56 and/or other components of the release apparatus 10 are intended to withstand. The conditioning of the locking shoes 56 and/or other components of the release apparatus enhance at least the surface hardness while achieving desired strength and toughness. For example, some embodiments apply the condition process to provide locking shoes with surface hardness (e.g., defined by a Rockwell "C" Hardness (HRC)), of at least those surfaces subject to flame hardening and quenching, that is at least twice a minimum HRC hardness at a core of the locking shoe, and in some instances has a surface hardness greater than 40 HRC and a hardness at a depth of about ⅛ inch from the surface of greater than 30 HRC.

Thus, a release apparatus or mechanism 10 configured to be used with relatively large anchor chains, cables or the like has been shown and described that has many desirable attributes and advantages which have been heretofore unavailable. The toric geometries 61 incorporated into the locking surface 57 reduce wear on the release apparatus while improving the operation of the release apparatus. Further, the locking shoes 56 and/or other components can be subject to the enhanced conditioning to provide components that can effectively be utilized in adverse conditions while providing reliable performance. Still further, the locking surface 57 and engagement surface 46 can be configured at a contact angle θ and corresponding inverse contact angle $θ_I$, in some embodiments, to achieve a balance of forces to allow the locking shoes to withstand extremely large forces without undue pressure on the cam 64 and/or the piston 40 and hydraulic cylinder 38. Additionally, some embodiments provide a hydraulic system that includes redundancy and one or more bypass valves 84 and/or leak valves 82 to provide leak protection in the hydraulic system and avoid fluid buildup in the hydraulic cylinder 38 that could result in pressures that could cause an undesirable, premature or false activation of the release apparatus. Further, the compact streamlined design, coupled with the isolation of movable parts from the underwater environment in which the release apparatus is used provides benefits in terms of operational reliability and maintenance.

Further, some embodiments heat treat and/or otherwise condition the locking shoes 56 and/or other components of the release apparatus 10 to achieve desired strength, toughness, hardness and/or fatigue strength to effectively operate in expected environments and/or conditions. For example, in some implementations, the release apparatus is utilized in Arctic environs, and at least the locking shoes 56 are conditioned to achieve desired high strength and toughness, a lack of brittleness, and good fatigue strength at low temperatures (e.g., 32° F. or lower). Some embodiments utilize a high strength steel in the chrome moly family (e.g., alloys 4140, 4340 or 4330 or similar steels) to achieve a desired strength, and condition such alloy to provide desired low temperature toughness (e.g., in accordance with commonly used Charpy V Notch (CVN) tests). Accordingly, some embodiments, apply a heat treating procedure or procedures to provide the a toughness (e.g., CNV values)

while retaining a strength and hardness of these alloy steel to effectively operate in accordance with intended operations within the predicted environments (e.g., Arctic conditions).

As described above, in some embodiments, portions of the locking surfaces of the locking shoes comprise toric geometries. These toric geometries are not in contact with and/or prevent contact of these toric portions of the locking surface from contacting the engagement surface of the retaining mating section 14 when the locking shoes are in the locked position. Further, in some embodiments, the toric geometries do not come into contact with and/or prevent contact of these portions of the locking surface from contacting the engagement surface as the locking shoes transition from the locked position to the release position.

While the invention is susceptible of various modifications and alternative forms, specific embodiments thereof have been shown by way of example in the drawings and have been described in detail. It should be understood, however, that it is not intended to limit the invention to the particular form disclosed but, on the contrary, the intention is to cover all modifications, equivalents and alternatives falling within the spirit and scope of the invention as expressed in the appended claims. Further, some embodiments relate to U.S. Pat. No. 3,905,190 to Pearlman, which is incorporated herein by reference in its entirety.

Additionally, while the invention herein disclosed has been described by means of specific embodiments, examples and applications thereof, numerous modifications and variations could be made thereto by those skilled in the art without departing from the scope of the invention set forth in the claims.

What is claimed is:

1. A release apparatus, comprising:
a body comprising a first mating section and a second mating section with the first mating section being connected to a first tether and the second mating section being connected to a separate second tether so that separation of the first mating section from the second mating section separates the first and second tethers;
a plurality of movable locking shoes secured with the first mating section and movable between a first position configured to lock the first mating section and the second mating section together and a second position configured to allow the first mating section and the second mating section to disconnect;
wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees from a plane perpendicular to a longitudinal axis of the release apparatus;
wherein the plurality of locking shoes are arranged radially about the longitudinal axis;
wherein the plurality of locking shoes are configured to pivot such that the locking surface of each of the plurality of locking shoes pivots away from the longitudinal axis when pivoted into the locked position, and toward the longitudinal axis when pivoted into the release position; and
a lubricant between the locking surface of each of the plurality of locking shoes and the engagement surface achieving a coefficient of friction defined by a ratio of a force of friction between the locking surface and the engagement surface and a force pressing the locking surface and the engagement surface together that is less than 0.30.

2. The release apparatus of claim 1, wherein the locking surfaces of each of the plurality of locking shoes is formed with the contact angle at about 21 degrees from the plane perpendicular to the longitudinal axis of the release apparatus when the plurality of locking shoes are in the locked position balancing forces to support the opposing forces on the first and second mating sections while allowing the plurality locking shoes to be moved in response to a threshold amount of pressure by a cam that causes movement of the locking shoes to disengage the locking surface from the engagement surface in response to a release command.

3. The release apparatus of claim 1, wherein portions of the locking surface of each of the plurality of locking shoes comprise toric geometries that are not in contact with the engagement surface of the second mating section when the locking shoes are in the first position and do not come into contact with the engagement surface as the locking shoes transition from the first position to the second position.

4. A release apparatus, comprising:
a body comprising a first mating section and a second mating section with the first mating section being connected to a first tether and the second mating section being connected to a separate second tether so that separation of the first mating section from the second mating section separates the first and second tethers;
a plurality of movable locking shoes secured with the first mating section and movable between a first position configured to lock the first mating section and the second mating section together and a second position configured to allow the first mating section and the second mating section to disconnect;
wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees from a plane perpendicular to a longitudinal axis of the release apparatus;
wherein the plurality of locking shoes are arranged radially about the longitudinal axis;
wherein the plurality of locking shoes are configured to pivot such that the locking surface of each of the plurality of locking shoes pivots away from the longitudinal axis when pivoted into the locked position, and toward the longitudinal axis when pivoted into the release position; and
a lubricant between the locking surface of each of the plurality of locking shoes and the engagement surface; and
wherein the locking surfaces of each of the plurality of locking shoes is formed with the contact angle at about 21 degrees from the plane perpendicular to the longitudinal axis of the release apparatus when the locking shoes are in the locked position.

5. The release apparatus of claim 4, further comprising:
wherein the locking surfaces of each of the plurality of locking shoes is formed with the contact angle at about 21 degrees balancing forces to support the opposing forces on the first and second mating sections while allowing the plurality locking shoes to be pivoted to disengage the locking surface from the engagement surface in response to a release command.

6. A release apparatus, comprising:
a body comprising a first mating section and a second mating section with the first mating section being connected to a first tether and the second mating section being connected to a separate second tether so that separation of the first mating section from the second mating section separates the first and second tethers;
a plurality of movable locking shoes secured with the first mating section and movable between a first position configured to lock the first mating section and the second mating section together and a second position configured to allow the first mating section and the second mating section to disconnect;
wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees from a plane perpendicular to a longitudinal axis of the release apparatus; and
a lubricant between the locking surface of each of the plurality of locking shoes and the engagement surface achieving a coefficient of friction defined by a ratio of a force of friction between the locking surface and the engagement surface and a force pressing the locking surface and the engagement surface together that is less than 0.30; and
wherein the locking surfaces of each of the plurality of locking shoes is formed with the contact angle at about 21 degrees from the plane perpendicular to the longitudinal axis of the release apparatus balancing forces to support the opposing forces on the first and second mating sections while allowing the plurality locking shoes to be moved in response to a threshold amount of pressure by a cam that causes movement of the locking shoes to disengage the locking surface from the engagement surface in response to a release command.

7. The release apparatus of claim 6, wherein portions of the locking surface of each of the plurality of locking shoes comprise toric geometries that are not in contact with the engagement surface of the second mating section when the locking shoes are in the first position and do not come into contact with the engagement surface as the locking shoes transition from the first position to the second position.

8. A release apparatus, comprising:
a body comprising a first mating section and a second mating section with the first mating section being connected to a first tether and the second mating section being connected to a separate second tether so that separation of the first mating section from the second mating section separates the first and second tethers;
a plurality of movable locking shoes secured with the first mating section and movable between a first position configured to lock the first mating section and the second mating section together and a second position configured to allow the first mating section and the second mating section to disconnect;
wherein each of the plurality of locking shoes comprises a locking surface configured to contact an engagement surface of the second mating section and maintain a position of the first mating section with the second mating section when the plurality of locking shoes are in the first position, and wherein the locking surface of each of the plurality of locking shoes is formed at a contact angle between about 18 degrees and 24 degrees from a plane perpendicular to a longitudinal axis of the release apparatus;
a hydraulic cylinder comprising a piston configured to transition between a closed position to an open position allowing the plurality of locking shoes to transition to the second position; and
one or more locking valves coupled with the hydraulic cylinder and configured to maintain locking hydraulic fluid within the hydraulic cylinder to maintain a backside pressure within the hydraulic cylinder inhibiting movement of a piston within the hydraulic cylinder toward the open position when the first mating section and the second mating section are in a locked configuration with the first mating section releasably secured with the second mating section.

9. The apparatus of claim 8, wherein the one or more locking valves are configured to transition to an open state in response to a release command allowing the locking hydraulic fluid to be released from the hydraulic cylinder and releasing the backside pressure.

* * * * *